Isaac Smith.
Composition Die Holder.

117826          Patented Aug 8 1871

Witnesses:
Chas. E. Warren
Peter DeLacy

Inventor:
Isaac Smith
By attorney
J. N. McIntire

UNITED STATES PATENT OFFICE.

ISAAC SMITH, OF NEW YORK, N. Y., ASSIGNOR OF ONE-HALF HIS RIGHT TO WILLIAM SANDERSON, OF SAME PLACE.

IMPROVEMENT IN DIE-MOLDS FOR COMPOSITION ARTICLES.

Specification forming part of Letters Patent No. 117,826, dated August 8, 1871; antedated July 25, 1871.

*To all whom it may concern:*

Be it known that I, ISAAC SMITH, of New York city and State, have invented an Improvement in Molds for Composition Articles; and I do hereby declare the following to be a full, clear, and exact description thereof, reference being had to the accompanying drawing forming part of this specification.

My invention relates to a new and useful improvement in composition molding-dies, and is adapted particularly to dies intended for molding articles having a circular contour; such, for instance, as knobs, buttons, &c. I have found by practice and experience that in molding various articles by compression of plastic materials the parts of the die have to be retained in the press for a short time; otherwise, on removal therefrom, the expansion of the compressed material of which the article is molded will force apart the two portions of the die and the shape of the article will be destroyed. I propose, by my invention, to provide a simple and efficient means for locking the parts of the die securely together the moment they shall have been forced home together by the press, so that the die and the contained material may be immediately removed from the press without danger of the molded article being spoiled, whereby much loss of time in the non-use of the press is avoided and a great desideratum gained, especially where a large amount of molding has to be done with few presses.

To enable those skilled in the art to make and use my invention, I will proceed to describe it more fully, referring by letters to the accompanying drawing, in which—

Figure 1:
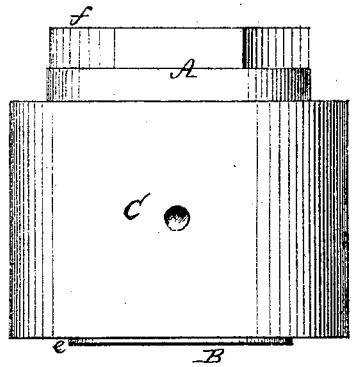
Figure 3:
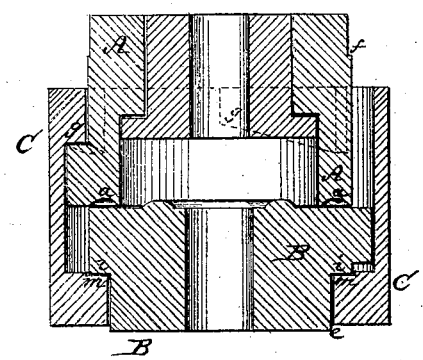
Figure 2:
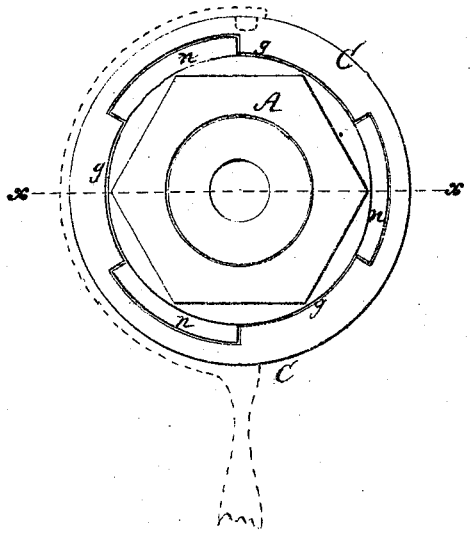
Figure 4:
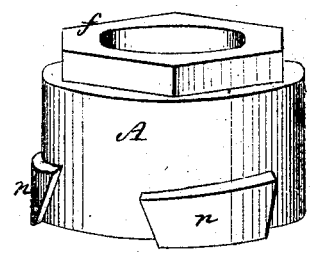
Figure 5:
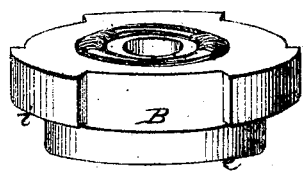

Figure 1 is an elevation of a circular die with my improvement applied thereto. Fig. 2 is a top view of the same; Fig. 3, section at *x x*, Fig. 2. Fig. 4 is a perspective view of one part of the die separated from the other parts, and Fig. 5 is a similar view of the other part of the die.

In the several figures the same part is designated by the same letter of reference.

A and B are the halves of the die, and C is the encircling securing-ring or clamping-collar. The parts A B of the die are formed of the proper shape when they come together to mold the composition placed between them into the proper form, and one part, A, is formed with the usual groove at *a* for the waste. The securing-collar C surrounds the bodies of the die A B, as shown, one of the parts, B, projecting slightly at *e*, and the other, A, at *f*, to be operated on by the press, and after the parts A B are forced together in the press the ring C is free to turn round on them, as and for purposes to be presently explained. The collar C is formed with an annular shoulder at *m* on its inner surface, which bears against the shoulder *i* of the part B, and said collar is also provided on its inner surface with projecting portions or lugs *g*, which are inclined or oblique on one edge, as clearly shown, and which come against the projections *n* of the part A (when said collar is turned) in such a manner as to wedge or force the parts A B of the die together.

In the use of my invention the part B is first placed within the collar C, and the plastic material or composition being put into the die, the other part, A, is also put in, when the whole—arranged as seen at Fig. 1—is put in the press and subject to the necessary pressure the moment the parts of the die are forced home together, (or as they are forced together;) the ring C is turned round by means of a wrench, (illustrated by the dotted lines at Fig. 2,) and the parts A B are firmly keyed or locked together by means of the shoulder *m* and lugs *g* bearing against the shoulder *i* of the part B, and lugs *n* of part A. The die and its clamping-collar are then removed immediately from the press. Whenever it is desirable to separate the parts of the die and extract the molded article the polygonally-shaped portion *f* of the part A is inserted in a correspondingly-shaped hole, a wrench is applied to the ring C to turn it, and the parts are separated very readily.

It will be understood that the form and proportions of the parts may be changed, and that even the construction of the clamping-collar may be varied from that shown without departing from the spirit of my invention so long as the collar and die are provided with inclined-faced projections or bearing-surfaces in such a manner that, by turning the collar while the die is held in the press, the parts of the die will be securely locked together.

Having fully explained my invention, what I claim as new, and desire to secure by Letters Patent, is—

The combination, with the parts of the die, of a securing-collar, the whole so constructed and operating as to permit the keying together of the parts of the die while in the press, substantially as described.

In testimony whereof I have hereunto set my hand and seal this 12th day of December, 1870.

ISAAC SMITH. [L. S.]

Witnesses:
J. N. McINTIRE,
CHAS. E. WARREN.